(12) United States Patent
Phillips

(10) Patent No.: US 7,779,049 B1
(45) Date of Patent: Aug. 17, 2010

(54) SOURCE LEVEL OPTIMIZATION OF REGULAR EXPRESSIONS

(75) Inventor: Chuck Phillips, Littleton, CO (US)

(73) Assignee: TW Vericept Corporation, Chicago, IL (US)

( * ) Notice: Subject to any disclaimer, the term of this patent is extended or adjusted under 35 U.S.C. 154(b) by 163 days.

(21) Appl. No.: 11/297,865

(22) Filed: Dec. 9, 2005

Related U.S. Application Data

(60) Provisional application No. 60/637,499, filed on Dec. 20, 2004.

(51) Int. Cl.
*G06F 17/30* (2006.01)
(52) U.S. Cl. .................................................. 707/809
(58) Field of Classification Search ................ None
See application file for complete search history.

(56) References Cited

U.S. PATENT DOCUMENTS

| | | | |
|---|---|---|---|
| 5,956,720 A * | 9/1999 | Fernandez et al. ............ 707/10 |
| 6,108,676 A * | 8/2000 | Nakatsuyama .............. 715/522 |
| 6,266,664 B1 | 7/2001 | Russell-Falla et al. |
| 6,366,910 B1 | 4/2002 | Rajaraman et al. |
| 6,453,345 B2 | 9/2002 | Trcka et al. |
| 6,477,571 B1 | 11/2002 | Ross |
| 6,487,666 B1 | 11/2002 | Shanklin et al. |
| 6,569,207 B1 * | 5/2003 | Sundaresan ................ 715/513 |
| 2002/0100031 A1 * | 7/2002 | Miranda et al. ............. 717/152 |
| 2002/0111951 A1 | 8/2002 | Zeng |
| 2003/0065800 A1 * | 4/2003 | Wyschogrod et al. ....... 709/230 |
| 2003/0110148 A1 | 6/2003 | Ulyanov et al. |
| 2004/0078190 A1 | 4/2004 | Fass et al. |
| 2005/0222975 A1 | 10/2005 | Nayak et al. |
| 2006/0005079 A1 * | 1/2006 | Kaplan et al. ................. 714/38 |
| 2006/0064407 A1 * | 3/2006 | Santosuosso ................... 707/3 |

OTHER PUBLICATIONS

Matt Sergeant, Internet Level Spam Detection and SpamAssassin 2.50, MessageLabs (undated).
Justin Mason, Filtering Spam with SpamAssassin, http://useast.spamassassin.org (undated).

\* cited by examiner

*Primary Examiner*—Don Wong
*Assistant Examiner*—Belinda Xue
(74) *Attorney, Agent, or Firm*—Hogan Lovells US LLP

(57) ABSTRACT

A method of optimizing regular expressions including determining an optimized form for regular expressions and presenting the optimized forms for the regular expressions to a user in a source-level representation. A system is provided for authoring regular expressions including a user interface enabling a user to author a regular expression defining a particular text pattern. The user interface enables the user to specify a target data set and a matching algorithm to be used with the regular expression. An optimizer implements transformation rules and processes for applying the transformation rules to an authored regular expression to generate an optimized regular expression presented in a source-level representation. The optimizer may select an alternate preferred pattern matching algorithm and an alternate preferred data source making adjustments to the pattern. An interpreter/compiler operates to receive source-level representations of optimized regular expressions and generate machine executable forms of the optimized regular expressions.

12 Claims, 2 Drawing Sheets

SOURCE LEVEL OPTIMIZATION OF REGULAR EXPRESSIONS

CROSS-REFERENCE TO RELATED APPLICATIONS

This application claims the benefit of U.S. Provisional Application No. 60/637,499, filed Dec. 20, 2004, which is incorporated herein by reference.

BACKGROUND OF THE INVENTION

1. Field of the Invention

The present invention relates, in general, to linguistic analysis, and, more particularly, to software, systems and methods for pattern matching in text files.

2. Relevant Background

Linguistic analysis is a field of study involving analytic procedures, concepts, and technique that enable machine-assisted analysis of speech, grammar, and language use. Linguistic analysis techniques are often used to analyze information, typically represented as text, so as to gain understanding of the meaning of the information. By understanding the meaning of the information, machines such as programmed computers can analyze the vast amount of information stored and communicated in digitized form and take actions in response to the meaning. Common uses for linguistic analysis techniques include searching text, searching and replacing text, testing for certain conditions in a text file or data stream, and email filtering as well as a variety of other functions. Text analysis is used in such diverse fields as data compression, pattern recognition, computational biology, database searching, and network security.

Unfortunately, information represented as text is difficult to analyze. Complex language constructs such as phrases, sentences, paragraphs and documents have a variety that makes it difficult to extract meaning from the text. Moreover, even single words themselves may exhibit sufficient variation in spelling, addition of prefixes and suffixes, misspelling, and the like that performing activities such as text matching become problematic.

Many programming languages include functions for performing rudimentary text processing. Such operations include string concatenation, string sorting, string matching, and other simple text manipulation operations that take advantage of the fact that text is represented as a binary value (e.g., an ASCII coded value) in most computer systems which allows mathematical operations to be extended to text. However, information represented as text does not exhibit the same rigid syntax and construction that is typical of numeric information. Hence, linguistic analysis often involves defining patterns that describe a range of possible string values. The defined patterns are then used to perform various functions such as matching and searching. Most programming languages do not contain constructs for efficiently defining text patterns. As a result, string operations implemented in conventional programming languages (or macros such as those generated by the major word processors and editors) tend to be slow, inflexible and relatively prone to errors.

Regular expressions, sometimes referred to as regex's or "REs", have developed as system for defining text patterns in linguistic analysis applications. Regular expressions are a notation system that defines sets of symbols and syntactic elements used to define text patterns. Once defined, text patterns are used by application software and algorithms to perform various text operations such as matching text, searching and replacing text, testing for certain conditions in a text or data stream, email filtering and other text manipulation tasks. Regular expressions are not software applications themselves but instead are a standardized way of representing text patterns in a way that can be readily used by a variety of software applications.

Regular expressions desirably exhibit "correctness" (i.e., the ability to produce desired results when evaluated by a software application) as well as efficiency (i.e., can be evaluated quickly on a computing platform using a reasonable amount of computing resources). Also, it is desirable that a regular expression is maintainable (i.e., it can be changed so that continued correctness and/or efficiency are obtained in light of changes in the execution environment). Although regular expressions are standardized, there are often a variety of equivalent or substantially equivalent forms in which a text pattern can be represented. "Substantially equivalent" means that in the context of a particular application the result of evaluating a regular expression will be the same. Even when two regular expressions produce the same results, different forms may execute significantly differently on a particular application or computing platform. For example, the processing resources, memory, execution speed, and the like may be significantly different between the alternate forms. Because of this, regular expressions benefit from being optimized for a particular algorithm, application, operating system, hardware platform, or other characteristics that define the runtime environment in which the expression will be used.

The special knowledge of words and language needed to implement text manipulation and linguistic analysis functions is very different than the knowledge required by other software specialists. As a result, regular expressions for a particular application are often written and maintained by linguistic specialists rather than computer programmers or information technology (IT) specialists. This situation creates a difficulty in that a linguistic analyst is responsible for achieving correctness of the regular expression while a programmer or IT specialized may be responsible for achieving efficiency of a regular expression through optimization.

Optimizing involves rewriting or transforming a set of regular expressions into a form that executes more efficiently in a particular software application, operating system environment, or hardware environment. A number of regular expression optimizations are described in *Mastering Regular Expressions*, 2nd edition, by Jeffrey Friedl, (July, 2002). However, optimizations are typically performed by optimization routines within platform-specific regular expression compilers. For example, in a PERL programming environment a regular expression is compiled, along with other programming constructs that define an application being implemented, into a binary internal representation before it is executed. During this compilation certain optimizations may be performed, however, it is difficult if not impossible for the regular expression author to control or evaluate these optimizations. Performing optimizations at compilation and/or run time does not work interactively with a linguistic specialist authoring a regular expression. Even when debugging processes are available and used, optimized regular expression generated by a compiler may look quite different than the originally authored regular expression, making it difficult for the author to validate that the optimized expression will perform as intended. Hence, the linguistic specialist may author a set of regular expressions designed to behave in a particular manner but will not find out whether the intended behavior is achieved until after the regular expressions are optimized and implemented in a particular application. Moreover, certain types of misbehavior may only be expressed in rare circumstances, in which case errors may take months or years to detect.

Hence, a need exists for systems, methods and software for generating and optimizing regular expressions that provide source-level messages about the optimization process to regular expression authors so that authors can focus on correctness rather than efficiency of the regular expressions. Further, there is a need for a regular expression authoring environment in which regular expressions are optimized and evaluated prior to run-time so that appropriate messages can be generated in response to determining that the optimization will affect correctness of the regular expression.

SUMMARY OF THE INVENTION

Briefly stated, the present invention involves a source-level regular expression (RE) optimizer specifically adapted for linguistic analysis. A source-level optimizer allows an author of an expression to test the expression, or a set of expressions, during the authoring phase. By testing the behavior of an optimized expression and comparing it to designed or intended behavior, the author can be confident that an optimized regular expression will produce the desired behavior in a run-time environment. When the actual results differ from the designed results an author can take several remedial actions such as changing the regular expression and/or changing the manner in which the optimization is performed.

In particular implementations, the present invention provides an optimizer that performs a source-level validation of a regular expression and reports errors prior to run-time. In other embodiments the optimizer identifies specified types of errors and auto corrects those specified types of errors. In other embodiments, an optimizer in accordance with the present invention identifies specified types of errors and automatically changes the manner in which optimization is performed to compensate for the specified types of errors.

In another aspect, the present invention involves a regular expression authoring environment that receives original regular expressions from an author and produces optimized regular expressions that are presented using conventional regular expression notation and syntax. Optimization messages are provided to regular expression authors prior to run time. These messages include notification regarding a transformation that has the potential of changing correctness of the transformed regular expression, notifications indicating a mistake in the original regular expression even though the optimized regular expression cannot affect correctness, and notifications of correction of common typographical errors.

In another aspect, the present invention involves a method of optimizing a regular expression or set of regular expressions by determining at least one optimized form for the regular expression and presenting the at least one optimized form for the regular expression to a user in a source-level representation.

DETAILED DESCRIPTION OF THE PREFERRED EMBODIMENTS

Figure 1:
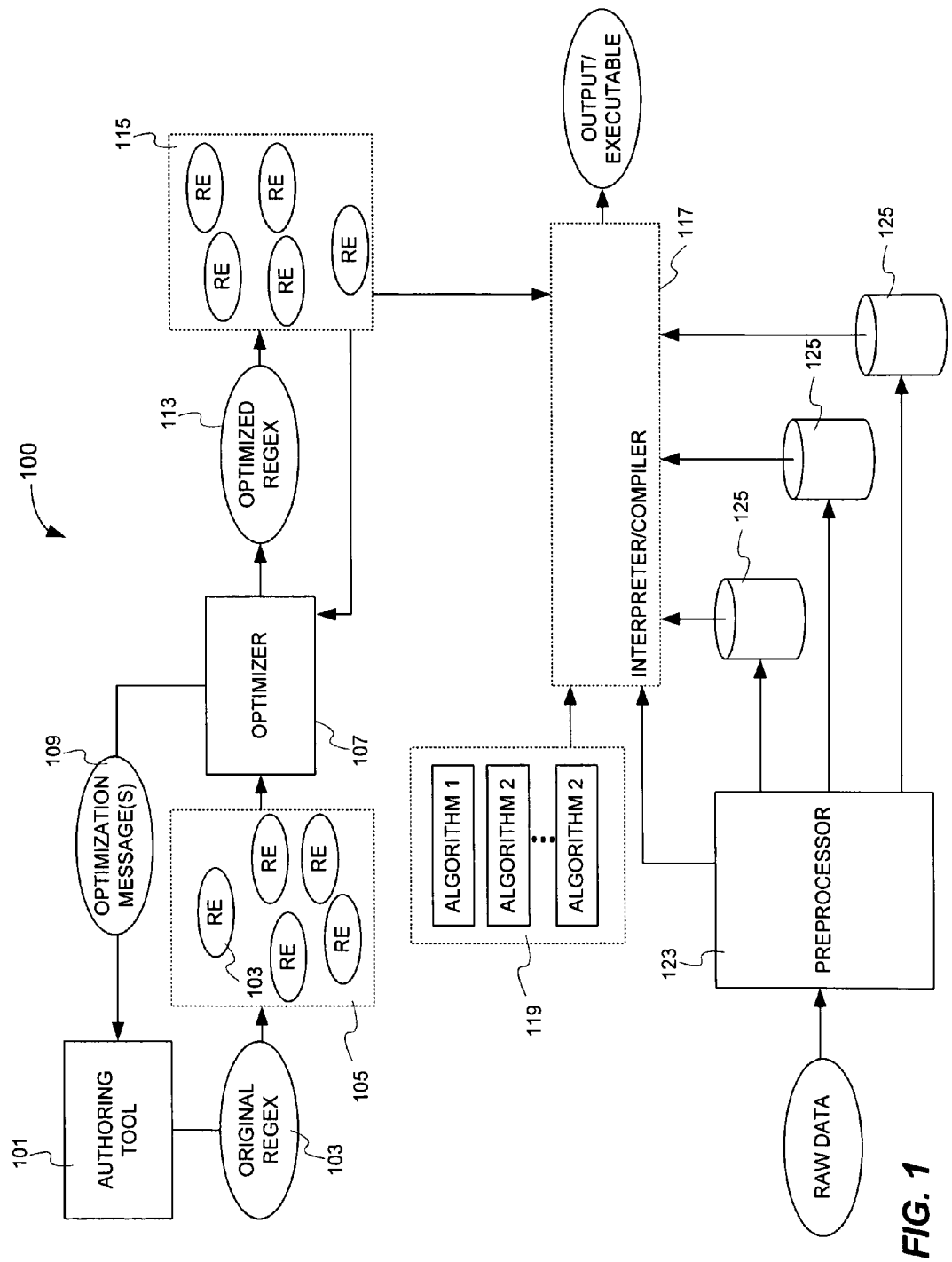
FIG. 1 shows an authoring environment and system for optimizing regular expressions in which the present invention is implemented.

The present invention relates to a regular expression authoring environment and optimization processes and system for regular expressions. In contrast to prior systems that would produce optimized binary representations of regular expressions, implementations of the present invention produce optimized regular expressions that are presented in the form of regular expressions. In other words, the optimized regular expressions are presented with syntax, operators, and other constructs that are consistent with regular expression notation. In this manner, the optimized regular expressions are readily understood by users familiar with regular expressions (e.g., linguistic specialists) who can examine the expressions for correctness.

The present invention also relates to systems and processes for normalizing regular expressions in sets or collections of regular expressions and then optimizing each regular expression with knowledge of the entire set of regular expressions to which it belongs. Normalization increases the likelihood of identifying duplicate and near duplicate regular expressions. By using knowledge of the entire set the occurrence of duplicate or near duplicate regular expressions can be minimized, overlapping regular expressions can be collapsed or aggregated, and semantic errors can be identified.

The present invention is illustrated and described in terms of systems and software for authoring and optimizing regular expressions for use in applications that match specified text patterns to text patterns in a data stream. Specifically, the present invention is useful in packet sniffing type systems that examine data packets on a network to identify patterns that are defined by sets of regular expressions. However, the present invention is useful in any application that uses regular expressions to define patterns including search engines, data compression, pattern recognition, computational biology, database searching, electronic mail and message filtering as well as network security. Various features of the present invention can be implemented in a variety of programming languages and programming environments.

In a typical implementation, a linguistic specialist will author a set of regular expressions that are intended to match certain desired text patterns in a target data set. The regular expressions are optimized by performing certain transformations that may change the order in which an expression is evaluated, split regular expressions in to two or more expressions, combine two or more regular expressions into a lesser number of expressions, or otherwise re-write the authored set of regular expressions into a form that will be more efficient when run by a particular application. To be useful to a particular software application, the regular expressions are transformed (i.e., interpreted or compiled) into sets of instructions that can be executed by a computer processor or virtual machine. After compilation/interpretation, the sets of instructions no longer use the regular expression syntax and operators and so, are not readily understood by linguistic specialists. When the optimization is performed during the compilation/interpretation process, making the optimization results un-reviewable to the linguistic specialist who authored the set of original expressions.

The optimization processes may be performed with varying degrees of aggressiveness. For example, an aggressive optimizer can be designed to improve execution performance irrespective of how long it takes to determine the optimization and/or the degree to which the optimized expressions are rewritten as compared to the original regular expressions. On the other hand, a less aggressive optimizer can be constrained so as to minimize the changes made to the authored regular expressions. More aggressive optimization typically is preferred when the application is performing text pattern matching in real time or of large data sets. Less aggressive optimization, however, can make the optimized results more readable by the linguists and therefore, easier to maintain. One optional feature of the present invention is the ability to specify a "readability" attribute which can direct the optimization process for a particular expression or set of expressions to be optimized for performance disregarding readability or optimized but limited by readability concerns to provide better feedback to the regular expression maintainers.

FIG. 1 illustrates an exemplary system 100 implementing features of the present invention. System 100 includes an authoring tool 101 used by an author to write one or more regular expressions 103. For a given problem or application, a set 105 of regular expressions 103 are typically written to define any number of text patterns that will be of interest to the application. Authoring tool 101 may be provided by a text editor, word processor, or special purpose tools such as PowerGREP and EditPad Pro and RegexBuddy by JGsoft as well as Expresso which is a tool for building and editing regular expressions in the Microsoft .NET environment available through Ultrapico.com. Further, in some embodiments, the features of the invention shown in exemplary system 100 may be embodied as a plug-in to an existing regular expression (RE) authoring tool (such as by modifying the tool or plugging in the functional modules of system 100 described herein into such a tool, e.g., the tools described in the preceding sentences or the like).

Optimizer 107 produces optimized regular expressions 113 that may be collected in a set 115 of optimized expressions where the set 115 contains some or all of the optimized regular expressions 113 for a particular software application. Optimizer 107 examines regular expressions 103 and/or sets 105 to transform the authored regular expressions 103 into optimized regular expressions 113. It is preferred that optimizer processes 107 have knowledge of a related set 105 of regular expressions 103 so that the optimization can identify duplicate and near duplicate expressions. A duplicate expression 103 may arise as a result of author error or simple oversight in large sets 105. Also, an author may be unaware of how constraints in a data set 125 will affect evaluation of an expression. Such constraints may be natural or imposed by preprocessor 123. The constraints may be such that two expressions that would be distinct if applied against unconstrained data sets will evaluate to the same or nearly the same pattern when applied against a constrained data set 125. Accordingly, providing optimizer 107 knowledge of a collection of expressions 105 as well as knowledge of any natural or imposed constraints on the data set 125 improves optimization.

When a regular expression 103 is optimized, optimizer 107 may generate one or more messages 109 upon detection of one or more conditions. For example, when the optimized regular expression 105 has a potential of changing the matching results, a message 109 can be generated to notify a user that the potential change has occurred. Notification messages 109 may be presented interactively or logged for later review. An exemplary set of notification rules is shown in Table 1.

TABLE 1

| Identified Condition | Remark |
| --- | --- |
| Any transformation that has the potential of changing match results. | Message required to notify of potential change in results and allow the specialist to confirm propriety of the transform. |
| Transformations that cannot possibly affect results are not required to produce messages. | Message is not required unless another notification condition exists. |
| Transformations that result in an empty string. | Empty strings (e.g., an expression that cannot logically match any pattern) are presumably not intended and indicate a likely logical or typographical error in the original regular expression. |
| Transformations that result in a duplicate or near duplicate of another pattern in the same collection of patterns. | Duplicate and near duplicate patterns are presumably not intended and indicate a likely logical or typographical error in the original regular expression. |
| Common typographical errors in the original regular expression. | Although it is useful to autocorrect spelling, capitalization, punctuation, and other common typographical errors, such errors are difficult to detect with certainty in regular expressions and so should generate a warning to the user when an automatic correction is performed. |

With regard to the third condition in Table 1, in the specific case of a typical Perl RE engine, the empty string matches everything instead of "nothing" as described in Table 1. Regardless of the RE engine, about the only reasonable behaviors for an empty string are "match everything," "match nothing," and "syntax error." In most of applications, none of these behaviors is desirable. With regard to the fifth or last condition of Table 1, besides low-level typographical errors, this condition also applies to common semantic errors. For example, when someone attempts to match a single quoted string in C, C++, Perl, and other applications, it is a common mistake for RE authors to write something like: /".*"/ which matches everything from the beginning of the first quoted string to the end of the last quoted string, instead of something like: /"([^"\\]+|\\.)*"/. Because the auto-corrected result will often match something different than the original, the RE author is preferably notified.

In a particular embodiment, it is desired to generate messages 109 only when some action or intervention may be required by the user. Hence, when a transform performed by the optimizer is known to produce the same matching result, there is no need for a message 109. In other embodiments, however, it may be desirable to generate a message 109 for every transform so that there is an auditable record or log created indicating what transforms were made. Moreover, not all notification messages 109 require further action by a user. For example, a message 109 that relates to an automatic correction that was applied to correct a presumed typographical error does not require any user response when there was in fact a typographical error.

Once regular expressions 103 are optimized and any messages 109 reviewed, the collection 115 of optimized regular expressions is created and made available for use by an application. In a particular implementation, optimized regular expressions 113 are incorporated into application logic 119 by interpreter/compiler 117. Application logic 119 implements user interfaces, interfaces to other hardware, interfaces to other software and data sets, and the like. Application logic 119 includes algorithms, for example matching engines, which use the optimized regular expressions. In operation, a software application generated or implemented by interpreter/compiler 117 implements, among other things, processes that find pattern matches for a particular optimized expression 105 within a data set 125 using a particular matching algorithm.

A variety of matching engines (e.g., algorithm 1, algorithm 2, algorithm N) are available and can be used in the application logic of a particular implementation, alone or in combination with special-purpose matching engines developed for a particular implementation. Three classes of matching algorithms of particular interest include deterministic, non-deterministic, and Aho-Corasick algorithms. Each matching algorithm has particular strengths and weaknesses for particular applications. For example, deterministic algorithms may execute very quickly but because they are inflexible it is sometimes difficult to define a deterministic algorithm that will perform a particular matching function. Non-deterministic algorithms are very flexible and easier to define but can execute very slowly as a result of their recursive nature.

Aho-Corasick implementations do not evaluate regular expressions but are useful for parallel string matching (i.e., matching a many strings in parallel with only one pass through the data). In contrast, almost all regular expression engines match only one pattern at a time, although the pattern can contain alternations and other complexities. When matching a large collection of patterns on lengthy data, Aho-Corasick is a faster matcher although is often the least flexible. Transformation of a regular expression into a form that is useful to an Aho-Corasick string matching algorithm involves generating a list of strings containing a string for each possible pattern match. For example, "[0-9A-Za-z]{10}" expands to 839,299,365,868,340,224 possible strings, which is impractical to implement. However, other regular expressions may expand to just tens or hundreds of strings, especially when domain constraints are taken into consideration, which may be very practical.

While it is possible to perform matches against raw data directly, in many instances it is valuable to use preprocessor 123 to perform certain transformations on the data itself to generate a preprocessed data set 125. Examples of pre-processing include removing punctuation, removing common words and phrases (e.g., "the", "a" and the like), transforming upper case characters to lower case, removing excess spacing, and the like. Preprocessing rules are developed by linguistic specialists to reduce the number and complexity of patterns required to recognize a particular semantic, which, in turn, improves both CPU and storage efficiency. Data preprocessing allows a single pattern, even a single literal string in some cases, to match a great many variations of input data, and this makes the work of the linguistic specialists easier as well as making pattern matching more processor and storage efficient.

Preprocessing may also be more aggressive by re-writing certain words, phrases and acronyms so that the preprocessed data set 125 becomes more consistent and/or less ambiguous. For example, "HD" may refer to "high-definition" in some contexts whereas it refers to "hard drive" in other contexts. While it may not be possible to resolve all such ambiguity, preprocessing 123 can be performed with domain-specific knowledge so as to expand "HD" into an appropriate term based upon rules for a particular data set. Given that one set of preprocessing rules may not be sufficient for all instances, the present invention contemplates that raw data may be preprocessed into multiple data sets 125, each according to a unique set of rules. In turn, each pre-processed data set 125 may be more or less suitable for matching by a particular type of algorithm or for a particular type of data. Returning to the example of acronyms, for example, a data set 125 that removes capitalization and punctuation may greatly speed pattern matching for a variety of common words but at the same time make acronyms harder to recognize. Hence, a regular expression that is designed to match a particular acronym (or a phrase including that acronym) may be best executed against a data set 125 in which capitalization and punctuation remain intact.

By implementing multiple data sets 125 and multiple matching algorithms, the present invention creates an environment in which regular expressions can be optimized to a greater degree than if a single data set and/or single algorithm were available. Optimizer processes 107 may take into account the specified target matching algorithm such that some or all of the transformations performed take into account the specific needs of a particular matching engine. For example, one type of matching engine may be more efficient when executing long, complex regular expressions. In this case, optimizer 107 will prefer to combine multiple shorter expressions 103 into a lesser number of more complex regular expressions 113. Conversely, for a matching engine that handles multiple shorter expressions more efficiently, optimizer 107 may decompose some complex regular expressions 103 into several less complex regular expressions 113.

One feature of a preferred implementation of the present invention is that the regular expression author can specify a target matching engine for each regular expression or for a group of regular expressions. Another feature of a preferred implementation of the present invention is that the regular expression author can specify a target data set 125 for each regular expression or for a group of regular expressions. A data set 125 comprises a collection of data that is to be analyzed by an application. Optimizer processes 107 preferably take into account the specified target matching algorithm and/or specified target data set such that some or all of the transformations performed take into account the specific needs of a particular matching engine. For example, one type of matching engine may be more efficient when executing long, complex regular expressions. In this case, optimizer 107 will prefer to combine multiple shorter expressions 103 into a lesser number of more complex regular expressions 113. Conversely, for a matching engine that handles multiple shorter expressions more efficiently, optimizer 107 may decompose some complex regular expressions 103 into several less complex regular expressions 113.

To allow better recognition of duplicate (and near-duplicate) patterns, optimized regular expressions 113 should be "normalized" to choose a specific syntax when multiple alternatives for the same semantic exist (preferably the most efficient alternative). For example, the semantic "one or more" can be written as either "+" or "{1,}" in a regular expression. Similarly, the semantic "zero or one" can be written as either "?" or "{0,1}" and the semantic "zero or more" can be written as either "*" or "{0,}". Normalization forces all optimizations to use one of the available syntactic alternatives. Likewise, whenever alternate orderings are possible, the output should be sorted. Normalization does not change the meaning or result of a pattern but may affect the efficiency of the optimized pattern 113. In some cases, the normalized form of an optimized regular expression 113 may be a form that executes less efficiently but places it in a form that allows duplicates and near duplicate regular expressions to be more readily detected. Recognition of duplicates allows automated collapsing of multiple patterns into one regular expression or a lesser number of regular expressions. Recognition of near-duplicates is a cue to the human maintainers of potential unintended redundancies.

When data transformations are applied to the raw data by preprocessor 123, care should be taken to ensure that compatible transformations are applied when generating optimized regular expressions 105. For example, in fully preprocessed data, different types of white space are collapsed into exactly one regular space. Optimizer 107 performs corresponding transformations on input regular expressions 103 and generates a message 109 when the input pattern 103 requires multiple consecutive spaces.

Moreover, although the preferred implementations allow or require a regular expression to be associated with a target algorithm (e.g., matching engine), it is contemplated that it may be useful to allow optimizer 107 to change the target algorithm to one that may be executed more efficiently. For example, an author may specify a non-deterministic algorithm. Optimizer 107 will consider optimizations for the specified non-deterministic algorithm but will also consider optimizations for other available algorithms such as the Aho-Corasick algorithm and deterministic finite automata regular expression engines. Additionally, optimizer 107 may consider alternative forms of data sets 125 or alternative preprocessing 123 from that specified by an author. In this manner, optimizer 107 can greatly improve optimization by contemplating transformations that were not contemplated by the linguistic specialist.

Figure 2A:
FIG. 2A illustrates a representation of a regular expression descriptor in accordance with the present invention.

FIG. 2A conceptually illustrates a descriptor corresponding to an original pattern 103 generated, for example, by a linguistic specialist. By comparison, FIG. 2B conceptually illustrates a descriptor corresponding to an optimized pattern 113 generated by optimizer 117. Original pattern 103 comprises a pattern specification such as a regular expression as well as an identification of a target algorithm and target data source. Similarly, optimized pattern 113 is described by a combination of a pattern specification such as a transformed regular expression as well as target algorithm and target data source. Of the three components in the pattern descriptors shown in FIG. 2A and FIG. 2B (pattern specification, target algorithm and target data set), all, some, or none may be transformed between the original pattern 103 and the optimized pattern 113. In other words, it is contemplated that some regular expressions 103 may have been generated in an optimized form.

A pattern descriptor may include other data and metadata that can be used by optimizer 107 and/or interpreter compiler 117 for application specific purposes. For example, the descriptor for an original pattern 103 may include an attribute that specifies no optimization should be performed or may specify that the optimization be performed without changing the target data set and/or target algorithm. This allows a linguistic specialist to control the optimization process to achieve desired results.

Figure 3:
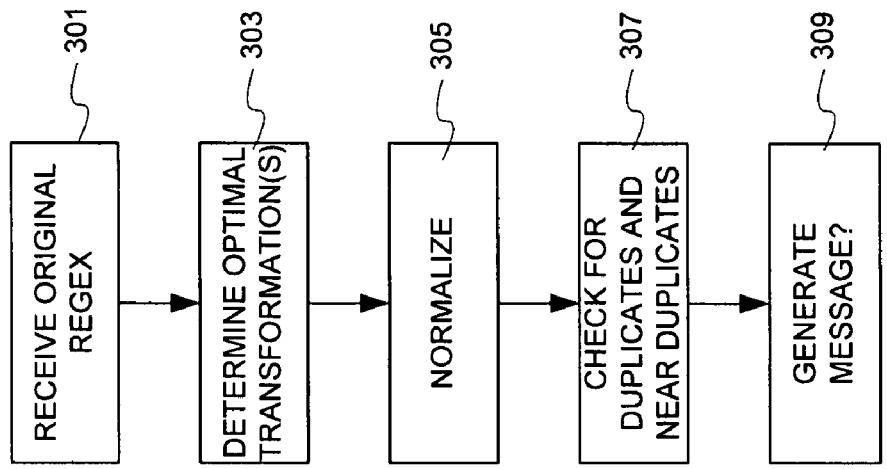
FIG. 3 shows a high-level flow diagram of an optimization process in accordance with an embodiment of the present invention.
Figure 2B:
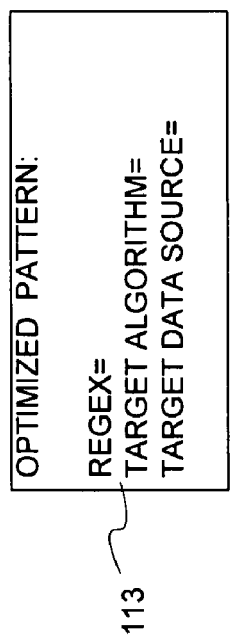
FIG. 2B illustrates a representation of an optimized regular expression descriptor in accordance with the present invention.

FIG. 3 illustrates a simplified set of activities performed in an implementation of the present invention. In 301, a regular expression 103 is received either singly or as a collection 105. In activity 303, one or more optimal transformations are determined. Optimal transformations may be identified by applying pre-specified transformation rules as described in more detail below. Activity 303 also includes identifying whether the target algorithm and/or target data set associated with a regular expression 103 can and/or should be altered. Activity 303 may generate a number of potential pattern descriptors (e.g., such as shown in FIG. 2B) that can be considered optimizations of the original pattern 103. When an optimization or candidate optimization may produce different results than the original regular expression, it should be noted that a message 109 should be generated at step 309. A similar notation should be made if other activities in the transformation step 303 indicate a message generating condition, such as an auto-correction of a typographical error and the like.

Some or all of the potential optimizations are normalized at activity 305. Normalization enforces certain rules related to ordering and semantics on the transformed patterns so as to make it more likely to detect duplicate or near duplicate patterns. Although FIG. 3 suggests a serial implementation, activities 303 and 305 are essentially performed together, although it is useful to understand that the present invention involves not just transformation into more optimal forms, but also normalization which may or may not be consistent with optimization.

Activity 307 involves checking for duplicates and near duplicates. Activity 307 refers to situations in which a collection of regular expressions are being optimized together and involves comparing a candidate optimized regular expression to some or all previously optimized regular expressions 113 in a collection 115. Pattern matching techniques that operate on the literal representation of the candidate and optimized regular expressions are a suitable mechanism for detecting duplicates and near duplicate expressions. When a precise duplicate pattern is identified optimizer 107 often can safely discard one of the duplicates. In activity 309, any notations of a condition that would require a message 109 are identified and appropriate messages 109 generated to a user or log file.

Example Optimization Rules

By way of example only, a useful set of optimization and normalization rules implemented in a particular example of optimization processes 107 include:

TABLE 2

| Rule Description | Example |
| --- | --- |
| Collapse consecutive counts applied to the same construct. | "a*a+" becomes "a+ " "(\w+ )?(\w+ )?(\w+ )? (\w+ )?" becomes "(\w+){0,4}". |
| Normalize the representation of characters. | In Pen regular expressions, occurrences of "\x4C" and "\x4c " are transformed into the equivalent character "L". |
| Replace capturing parentheses with non-capturing parentheses (or otherwise eliminate collection of this information) | In applications where it is only necessary to statistically monitor or analyze the data it may be unnecessary to actually capture the strings containing the matching pattern. String capturing can consume significant computational resources which are made available for other purposes by transforming the regular expression from one that captures to one that does not capture. /a(bc)? d/ in Perl RE syntax becomes /a(?:bc)?d/. |
| Recognize and eliminate duplicates. | Often as the result of other transformations, duplicate alternatives will appear in alternations and/or as duplicate characters in character classes. /(foo\|bar\|bar)/ becomes /(foo\|bar)/ |
| Factor out common prefixes in alternations to reduce backtracking. | Particularly for non-deterministic matching algorithms, reducing backtracking can have significant performance benefits. By factoring out common prefixes. /(ab\|ac)/ becomes /a(b\|c)/ |
| Factor out common suffixes. | After factoring common prefixes for speed, factor out common suffixes if "long enough" (or large enough in the regex engine's internal representation) to reduce RAM consumption. For example: /a(b[n-z]+\|c[n-z]+)/ becomes /a(b~c)[n-z]+/. |
| Distribute common trailing context. | When "short enough " (or small enough in the regex engine's internal representation) can improve performance with some matching engines. For example: /(foo\|bar)baz/ becomes /(foobaz\|barbaz)/. |
| Transform single-letter alternations into character classes. | For example: "/a\|b/ " becomes "/[ab]/ " Evaluation of the character class form is often faster, and rarely slower than evaluation of a single-letter alternation. |

TABLE 2-continued

| Rule Description | Example |
| --- | --- |
| Remove optional leading and trailing context. | In applications that are only concerned with whether a match occurred and not what specifically matched, optional leading and trailing context may be irrelevant For example: /a*bc+/ becomes /bc/ /words?/ becomes /word/ /foo(bar\|baz? )/ becomes /foo(bar\|ba)/ |
| Constant strings are opportunistically migrated earlier in the regex. | For example: /foo( bar)? baz/ becomes /foo (bar )? baz/. This allows better use of the Boyer-Moore matching algorithm when at the beginning of a Perl regexp, and otherwise allows potentially earlier rejection of non-matches. |
| Remapping characters remapped in the input data. | For example in Pen 4 (circa 1991), case-insensitive patterns caused the both the characters in the RE and the characters in the data to be folded into the same case. This caused a delay in startup time (to prepare a potentially very long data string) in exchange for a faster run time. However, the result of the RE change was not available in source form. |
| Remove disallowed characters. | When domain-specific pre-pattern-matching data preparation removes certain characters from the data, the same characters should be removed from the regular expression. For example, if all non-printable characters are removed before pattern matching begins, patterns containing non-printable characters cannot possibly match. |

It is beneficial to apply optimizing/normalizing transformations iteratively until either no more transformations can be applied (e.g., all transformation rules are exhausted), or until a previously-encountered result is detected (a transformation loop). Often, one optimization enables another, which in turn, enables yet another. For example:

/a(b[n-z]+|c[n-z]+m*)/ becomes /a[bc][n-z]/
/foo(bar|baz?)/ eventually becomes /fooba/
and
/a(b?c*|d|e)z/ eventually becomes /a([de]|c+|bc*)?z/

For the most part, auto-corrections and optimizations are written assuming the normalized form as input. This often allows transformations to be simpler since not every possible input representation need be accounted for. Likewise, one normalization transformation may depend on another normalization transformation.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

I claim:

1. A method of optimizing a regular expression using a system comprising an authoring tool, an optimizer, and a compiler, the method comprising:
   receiving the regular expression in a single source-level language with the authoring tool of the system;
   normalizing the regular expression;
   responsive to normalizing the regular expression, determining at least one optimized form by the optimizer of the system in the same single source-level language for the regular expression;
   presenting the at least one optimized form for the regular expression to a user with the authoring tool of the system in a source-level representation in the same single source-level language;
   determining whether the at least one optimized form for the regular expression produces different results than the regular expression;
   responsive to the at least one optimized form for the regular expression producing different results than the regular expression, presenting the at least one optimized form for the regular expression to the user; and
   incorporating the at least one optimized form of the regular expression into application logic using the compiler.

2. The method of claim 1, wherein the determining of the at least one optimized form comprises determining an intermediate result prior to obtaining the at least one optimized form, and wherein the method comprises presenting the intermediate result to the user.

3. The method of claim 1 wherein the act of determining at least one optimized form comprises:
   iteratively applying pre-selected transformations to the received regular expression, wherein each iterative transformation produces a candidate optimized regular expression;
   determining whether each candidate optimized regular expression matches a previously generated optimized regular expression;
   upon determining that a candidate optimized regular expression matches a previously generated optimized regular expression, discarding the candidate optimized regular expression when the candidate optimized regular expression does not change a result obtained when implementing a collection of regular expressions; and
   upon completing application of all of the pre-selected transformations without determining that candidate optimized regular expression matches a previously generated optimized regular expression, outputting the candidate regular expression as an optimized regular expression.

4. The method of claim 1 further comprising normalizing each candidate regular expression before determining whether each candidate optimized regular expression matches a previously generated optimized regular expression.

5. The method of claim 1 wherein the received regular expression is associated with a target algorithm for evaluating the regular expression, and the optimization is performed at least partially based upon knowledge of the target algorithm.

6. The method of claim 5 wherein the target algorithm that is associated with the regular expression is selected from the group consisting of: deterministic finite state machine algorithms; non-deterministic finite state machine algorithms, and parallel string matching algorithms.

7. The method of claim 5 further comprising:
   determining an alternative preferred algorithm when practical; and
   transforming the received regular expression into a form that is appropriate for the alternative algorithm.

8. The method of claim 1 wherein the received regular expression is associated with a target data set against which the regular expression will be applied to identify patterns within the target data set that match a pattern defined by the regular expression, and the optimization is performed at least partially based upon knowledge of the target data set.

9. The method of claim 8 further comprising:
   selecting a preferred alternative data set when practical; and
   transforming the received regular expression into a form that is appropriate for the selected alternative data set.

10. The method of claim 1 wherein the act of determining an optimized form is constrained to improve readability of the optimized regular expression when it is presented to the user in a source-level representation.

11. The method of claim 1 further comprising compiling a software application incorporating the optimized form of the regular expression, wherein the act of compiling includes machine-level optimization of code constructs associated with the optimized form of the regular expression.

12. The method of claim 1 further comprising:
determining whether the optimized form of the regular expression indicates a condition that requires notification; and
generating a message in response to determining that the optimized form of the regular expression may produce a different result.

* * * * *